United States Patent [19]

Kyrtsos

[11] Patent Number: 5,105,895

[45] Date of Patent: Apr. 21, 1992

[54] METHOD AND APPARATUS FOR IDENTIFYING LOAD CYCLE FUNCTIONS

[75] Inventor: Christos T. Kyrtsos, Peoria, Ill.

[73] Assignee: Caterpillar Inc., Peoria, Ill.

[21] Appl. No.: 569,900

[22] Filed: Aug. 20, 1990

[51] Int. Cl.$^5$ .................. G01G 19/40; G01G 19/08; G01G 19/10

[52] U.S. Cl. .................. 177/25.14; 177/139; 177/141

[58] Field of Search .................. 177/25.14, 139, 141, 177/185

[56] References Cited

U.S. PATENT DOCUMENTS

| | | | |
|---|---|---|---|
| 4,230,196 | 10/1980 | Snead | 177/141 |
| 4,618,014 | 10/1986 | Kobayashi | 177/185 X |
| 4,660,160 | 4/1987 | Tajima et al. | 177/185 X |
| 4,715,457 | 12/1987 | Amacher et al. | 177/185 X |
| 4,771,836 | 9/1988 | Naito et al. | 177/185 X |
| 4,858,709 | 8/1989 | Stahl | 177/185 X |
| 4,919,222 | 4/1990 | Kyrtsos et al. | 177/139 |
| 4,995,468 | 2/1991 | Fukuda | 177/139 |

Primary Examiner—George H. Miller, Jr.
Attorney, Agent, or Firm—Steven R. Janda

[57] ABSTRACT

In many applications, a loader performs a loading operation that includes, sequentially: digging and/or crowding a stock pile, racking back the bucket to maintain the load, travelling to a dump site or a transport vehicle while raising the bucket, and finally dumping the load from a raised position. For many devices, such as payload monitors and productivity indicators, it is important to have an indication of which function in the loading operation is being performed. A loading function identifier senses, stores, and averages the hydraulic pressure in a lift cylinder. The sensed and averaged data are compared to a series of predetermined constants to identify the function being performed. The algorithms used in this invention are applicable to a number of work vehicles having at least one work implement linkage and at least one hydraulic cylinder for modifying the linkage geometry.

17 Claims, 3 Drawing Sheets

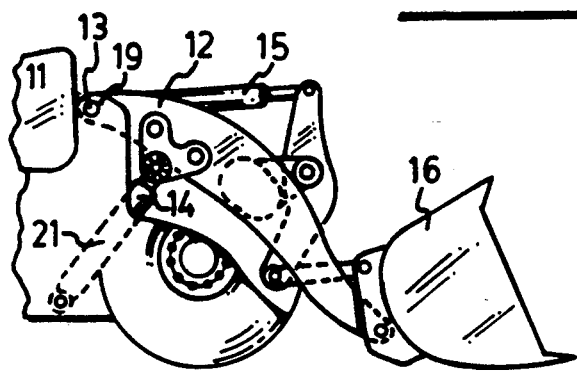
Fig_1_
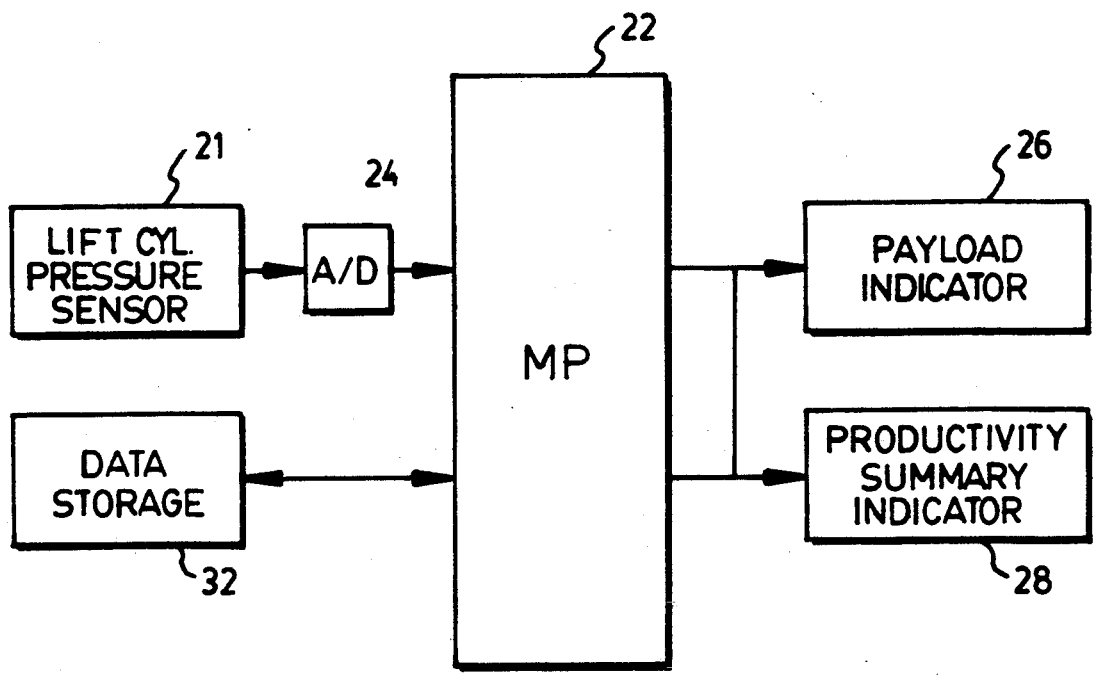
Fig_2_

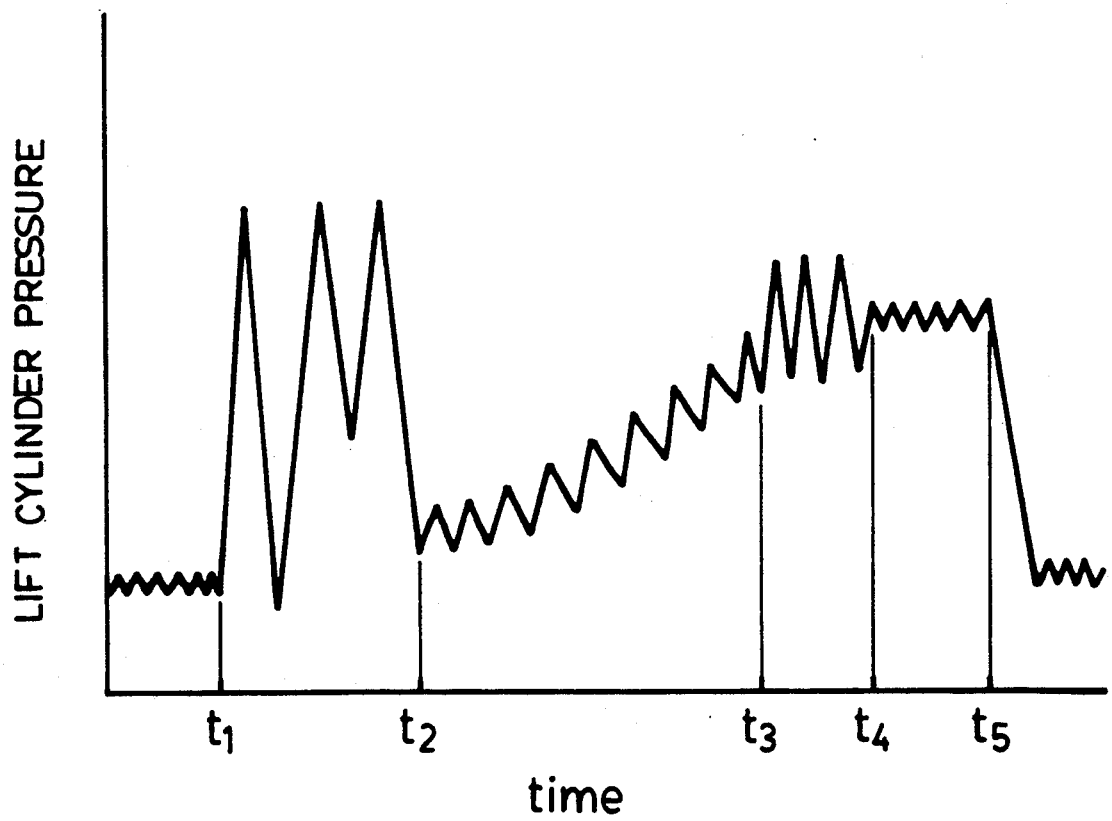
Fig-3-

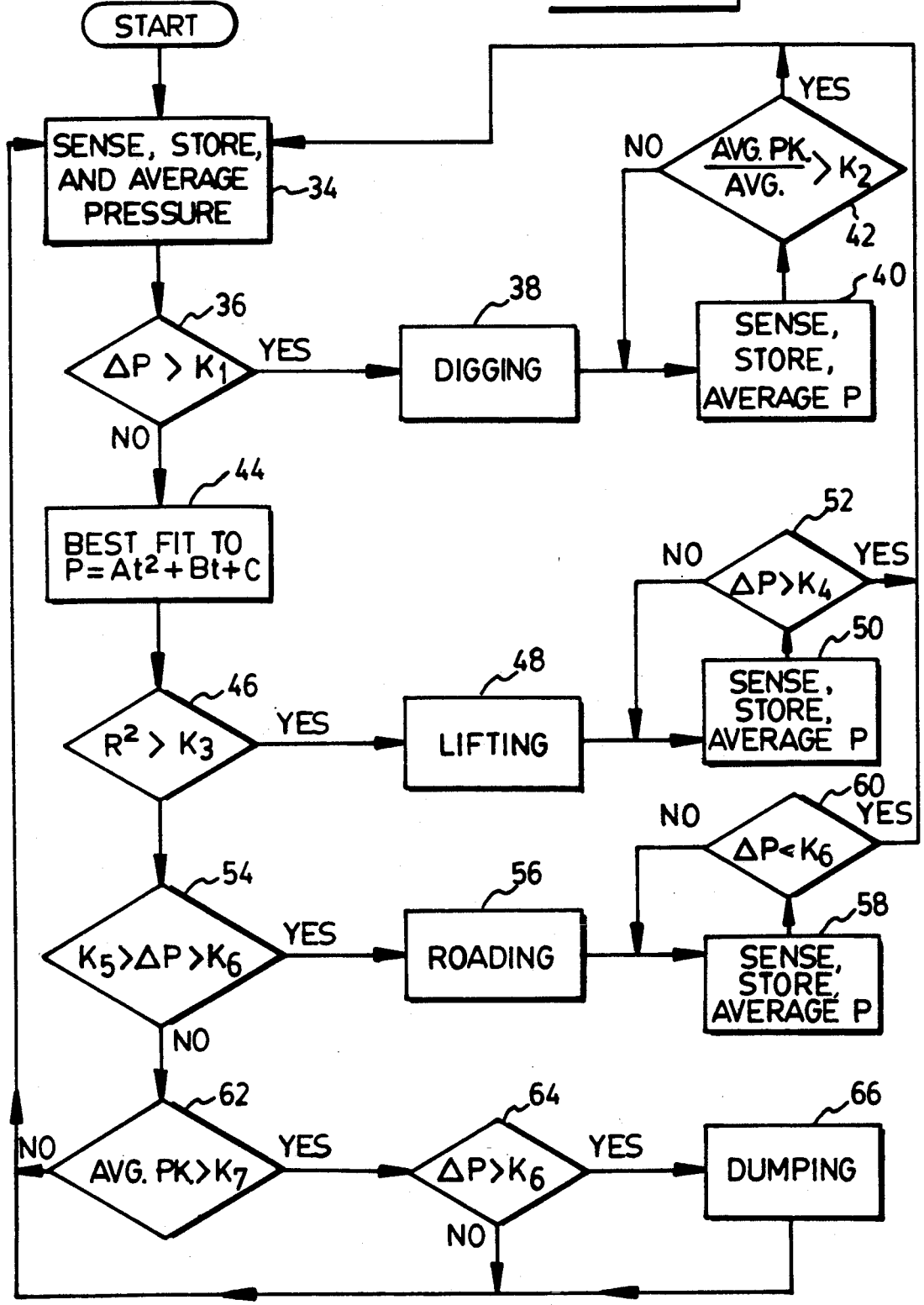
Fig_4

METHOD AND APPARATUS FOR IDENTIFYING LOAD CYCLE FUNCTIONS

TECHNICAL FIELD

This invention relates generally to vehicles for transferring bulk material and, more particularly, to an apparatus and method for identifying the functions of a load cycle being performed by the vehicle.

BACKGROUND ART

Vehicles such as loaders are used generally to transfer bulk material from a stock pile onto transport vehicles such as trucks or railroad cars. In such vehicle loading applications, the loader performs a series of functions including: digging and/or crowding a stock pile, racking back the bucket to maintain the load, travelling to a dump site or a transport vehicle while raising the bucket, and finally dumping the load from a raised position.

Various devices used on such loader vehicles, such as payload monitors, productivity indicators, and suspension monitors, typically monitor an operational parameter of one or more hydraulic cylinders. The characteristics of the sensed parameters are often dependent on which function in the loading operation is being performed. As a result, these devices must have an indication of which function is being performed in order to know how the sensed parameter is expected to behave.

In the case of payload monitors, it is generally the lifting phase that is of the greatest interest. During the lifting phase, the lift cylinder pressure versus time characteristic can be represented by a second order polynomial whereas during the digging phase there is no identifiable relation between the payload in the bucket and the sensed parameters. In productivity indicators, the length of time during which each of the functions is performed is of interest to a loading site manager. Suspension monitors are most capable of providing accurate indications of the suspension performance or the road surface characteristics during the roading function.

Some prior art systems have used hall effect sensors to detect the implement being at a predetermined location while others have included operator interfaces to allow the operator to indicate when a function of interest is being performed. Both of these methods are disadvantageous because they do not indicate all of the functions in the loading cycle or because they disrupt the loading operation, or both. The hall effect method produces inaccurate results if the bucket is not raised above the predetermined location. The operator interface method increases the operator's work load and can produce inaccurate results if the operator is not diligent in indicating the proper function.

A payload monitor disclosed in U.S. Pat. No. 4,919,222 issued to Kyrtsos et al. on Apr. 24, 1990 includes an apparatus for identifying a lifting function by sensing the extension of the lift cylinder and comparing the sensed extension to a number of predetermined constants. While this device provides an accurate indication of the lifting function, it could be improved by making it operable with systems which sense hydraulic pressure only. In addition, the disclosed embodiment does not identify any of the other functions in the loading operation.

The present invention is directed to overcoming one or more of the problems set forth above.

DISCLOSURE OF THE INVENTION

The invention provides an apparatus for identifying the functions of a loading cycle being performed by a work vehicle. The apparatus does not alter or interfere with the operator's loading operation and is installable on existing or new loaders without linkage reconfiguration.

In one aspect of the present invention, an apparatus is provided for a vehicle having at least one lift cylinder for elevating a payload carrier. The apparatus senses the hydraulic pressure in the lift cylinder and responsively produces a plurality of pressure signals. The pressure signals and at least one predetermined constant are stored in a memory device. The apparatus identifies the function being performed in the loading cycle in response to the plurality of pressure signals and the predetermined constant.

In another aspect of the invention, a method is provided for determining which of a plurality of functions in a loading cycle is being performed by a vehicle having at least one lift cylinder for elevating a payload carrier. The method comprises the steps of sensing the hydraulic pressure of the lift cylinder and responsively producing a plurality of pressure signals, storing the pressure signals and at least one predetermined constant, and identifying the function being performed in the loading cycle in response to the plurality of pressure signals and the predetermined constant.

The invention also includes other features and advantages which will become apparent from a more detailed study of the drawings and specification.

BRIEF DESCRIPTION OF THE DRAWINGS

FIG. 1 is a side view of the forward portion of a loader vehicle;

FIG. 2 is a block diagram of an embodiment of the present invention;

FIG. 3 is a graphical representation of lift cylinder pressure versus time; and

FIG. 4 is a flow chart of an algorithm used in the embodiment of FIG. 2.

BEST MODE FOR CARRYING OUT THE INVENTION

In FIG. 1, a load function identifier is generally represented by the element number 10. Although FIG. 1 shows a forward portion of a wheel type loader vehicle 11 having a payload carrier in the form of a bucket 16, the present invention is equally applicable to vehicles such as track type loaders, and other vehicles having similar loading implements. The bucket 16 is connected to a lift arm assembly 12, which is pivotally actuated by two hydraulic lift cylinders 14 (only one is shown) about a pair of lift arm pivot pins 13 (only one is shown) attached to the vehicle frame. A pair of lift arm load bearing pivot pins 19 (only one is shown) are attached to the lift arm assembly and the lift cylinders 14. The bucket 16 can also be tilted by a bucket tilt cylinder 15.

A pressure transducer 21 senses the hydraulic pressure in one of the lift cylinders 14. Although there are two lift cylinders 14, the pressure in each of the cylinders 14 is generally the same for a given payload and given lift arm geometry. Thus, sensing pressure at one of the cylinders 14 is sufficient for the present application.

Referring to FIG. 2, the pressure transducer 21 produces an analog signal in response to the magnitude of the hydraulic pressure in the lift cylinder 14. An analog-to-digital (A/D) converter connected to and between the pressure transducer and a microprocessor 22 converts the analog pressure signal to a digital pressure signal that is read by the microprocessor 22. In one embodiment, a payload weight indicator 26 is connected to the microprocessor 22 and displays the measured payload weight based on computations made by the microprocessor 22. A productivity indicator 28 is provided to indicate the time required to perform a loading operation and the amount of material loaded by the vehicle 11 in a preselected amount of time. A memory device 32 is also connected to the microprocessor to store the pressure signals and a series of predetermined constants.

Referring now to FIG. 3, a graphical representation of the lift cylinder pressure versus time is shown for an entire loading operation. As shown, the curve has definite, identifiable characteristics during the performance of each function denoted by the reference points, $t_n$. During the digging function, shown between $t_1$ and $t_2$, sharp spikes in the lift cylinder pressure occur as a result of the operator ramming a bank or stockpile or digging material from a selected site. During the lifting phase, shown between $t_2$ and $t_3$, the curve follows a generally parabolic path. While the pressure signal includes random variations caused by the suspension and work surface, there is a strong second order correlation between lift cylinder pressure and time. During the end of lift phase of the loading operation, denoted by $t_3$ and $t_4$, the average pressure signal remains substantially constant but there are substantial positive and negative spikes superimposed on the average. These spikes are due to the payload carrier reaching a kickout position at which the lifting function is abruptly stopped. The inertia of the payload carrier and load, together with the suspension of the loader, causes oscillations about the kickout position. During the roading function, shown between $t_4$ and $t_5$, the average pressure signal also remains substantially constant but the oscillations about the average are typically less than during the end of lift phase. The dumping function, following $t_5$, is easily identified by the sharp transition from a relatively high lift cylinder pressure to a relatively low pressure.

Referring now to FIG. 4, the lift cylinder pressure signal from the pressure transducer 21 is sampled in control block 34 and subsequently stored in memory device 32 at a predetermined rate. The rate is a matter of design choice, but is preferably on the order of one-tenth of a second. A predetermined number of the stored signals are time averaged in order to produce an average pressure signal. The number of signals used to compute the average pressure signal is a matter of design choice and is based on the desired rate of response of the average pressure signal to changes in the sensed pressure signal. The average pressure signal is also stored in the memory device 32.

In block 36, a difference signal, $\Delta P$, is created by subtracting a preselected previous pressure signal from the most recent pressure signal. In the preferred embodiment, the preselected previous pressure signal is the pressure signal that was sensed immediately prior to the most recent pressure signal. The difference signal is then compared to a predetermined constant that is empirically chosen in response to the magnitude of the pressure spikes occurring during the digging function. If the difference signal exceeds this constant, the digging function is indicated 38. It should be understood that in this decision block, as well as all subsequent decision blocks, the decision is made in response to a condition existing for a preselected amount of time. In this way, transients and noise are much less likely to cause erroneous functions to be indicated.

The sense, store, and average steps are then repeated 40. In block 42, the maximum average pressure signal in a predetermined number of average pressure signals is obtained. The maximum average pressure signal is then divided by the most recently calculated average pressure signal and the resulting quotient is compared to a predetermined constant. Since the magnitude of the quotient is indicative of the rate at which the average pressure signal is changing, this predetermined constant is empirically chosen in response to observed decreases in the average pressure signal at the end of the digging function. If the quotient does not exceed the predetermined constant, then the operator is still performing the digging function and the algorithm returns to block 40. If the quotient exceeds the predetermined constant, then the digging function has ceased and the algorithm proceeds back to block 34.

If the result of the comparison in block 36 is negative, a preselected number of pressure signals are curve fit 44 to a second order, time dependent polynomial using an error minimizing technique, preferably least squared error.

As is well known in the art, an $R^2$ value obtained from the least squared error technique is a good indication of the degree to which the derived function explains changes in the actual data. In this application, therefore, there is a positive relationship between the $R^2$ value and the degree to which the actual pressure versus time characteristic is parabolic. The lifting phase is unique in that the pressure versus time characteristic is parabolic. Therefore, the lifting phase can be identified by the $R^2$ value exceeding a predetermined constant 46. The sense, store and average pressure signal steps are repeated 50 and a difference signal, as described above, is calculated 52. If the difference signal exceeds a predetermined constant, then the pressure versus time curve is sharply changing and the end of lift phase is indicated. The algorithm then returns to block 34. Otherwise, the vehicle is still lifting the payload carrier and the algorithm returns to block 50. The predetermined constant is empirically chosen in response to the pressure spikes in the pressure versus time curve observed immediately after the payload carrier reaches a kickout position.

If the $R^2$ value does not exceed the predetermined constant in block 46, the loader is not performing the lifting operation and the algorithm proceeds to block 54. The difference signal is compared to a pair of predetermined constants, $k_5$ and $k_6$. These predetermined constants are empirically chosen in response to observed changes in the pressure signal during the roading function. Two constants are necessary to account for positive and negative variations from the average. Alternatively, the absolute value of the difference signal can be compared to a single constant. The sense, store, and average steps are then repeated 58. The difference signal is computed, as described above, and compared to $k_6$. If the difference signal is less than $k_6$, then the roading operation has ended and the algorithm returns to block 34.

In blocks 62 and 64, the difference signal is calculated and a maximum average pressure signal is obtained from a preselected number of stored average pressure signals. The number of average pressure signals used in block 62 is a matter of design choice. If the maximum average pressure signal exceeds a predetermined constant and the difference signal is less than $k_6$, then the dumping function is indicated 66. The constant being compared to the maximum average pressure signal is empirically chosen in response to observed lift cylinder pressures when the vehicle has a load in the payload carrier which is in a raised position. If the maximum average pressure signal does not exceed the predetermined constant or the difference signal is less than $k_6$, then the algorithm returns to block 34.

In some instances, it may be desirable to alter the general algorithm shown in FIG. 2 in response to the normal sequence of events in a particular loading cycle. For instance, if the digging function is the most recent function that has been indicated, then either the lifting function or the roading function is most likely to be performed next. Likewise, the dumping function is expected to be followed by either the roading function or the digging function. Therefore, the algorithm can be directed to check the most likely functions more frequently than the other functions. Such alterations to the algorithm would be based on the typical sequence of functions being performed in a given application and may be changed for different applications.

INDUSTRIAL APPLICABILITY

The operation of an embodiment of the present invention is best described in relation to its use in loading applications where knowledge of payload weight is important. This payload measurement system is also valuable in operations where it is desirable to monitor loader vehicle productivity.

A typical work cycle of a loader 11 includes, sequentially: digging and/or crowding a stock pile, racking back the bucket 16 to maintain the load, travelling to a dump site or a transport vehicle while raising the bucket 16, and finally dumping the load from a raised position. This loading cycle is not interrupted by the use of the instant invention.

In response to observed changes in the sensed hydraulic pressure in the lift cylinder 14, this apparatus automatically identifies which of the above-identified functions in the loading operation is being performed and delivers this information to a payload monitor, productivity indicator, suspension monitor, or any such device that requires knowledge of the function being performed in order to operate properly.

The present invention is also expandable to other vehicles by compensating for different linkage configurations. Anticipated applicable vehicle types are excavators, front shovels, backhoe loaders, and any vehicles having at least one linkage with at least one hydraulic cylinder for modifying that linkage configuration. For these vehicle linkage configurations, additional pressure sensors may be needed to detect cylinder pressure in a plurality of lift cylinders during the work cycle. However, the basic function of the above described invention remains the same.

Any specific values used in the above descriptions should be viewed as exemplary only and not as limitations. Other aspects, objects, and advantages of this invention can be obtained from a study of the drawings, the disclosure, and the appended claims.

I claim:

1. An apparatus for a vehicle having at least one lift cylinder for elevating a payload carrier, said vehicle generally executing a plurality of functions in a loading cycle, comprising:
    means for sensing the hydraulic pressure of said lift cylinder and responsively producing a plurality of pressure signals;
    means for storing said plurality of pressure signals and at least one predetermined constant;
    means for retrieving said plurality of pressure signals and said predetermined constant; and
    means for identifying the function being performed in the loading cycle in response to said plurality of pressure signals and said predetermined constant.

2. An apparatus, as set forth in claim 1, wherein said means for identifying the function includes means for time averaging said plurality of pressure signals and thereby producing a plurality of average pressure signal.

3. An apparatus, as set forth in claim 1, wherein said means for identifying the function includes:
    means for deriving a second order time dependent polynomial in response to said plurality of pressure signals;
    means for producing a first signal being indicative of the degree of fit of said plurality of pressure signals to said second order time dependent polynomial; and
    means for detecting a lifting function in response to said first signal exceeding a first predetermined constant.

4. An apparatus, as set forth in claim 3, including:
    means for comparing one of said pressure signals to another of said pressure signals and responsively producing a difference signal; and
    means for detecting an end of lift function in response to said difference signal exceeding a second predetermined constant.

5. An apparatus, as set forth in claim 1, wherein said means for identifying the function includes:
    means for comparing one of said pressure signals to another of said pressure signals and responsively producing a difference signal; and
    means for detecting a digging function in response to said difference signal exceeding a predetermined constant.

6. An apparatus, as set forth in claim 5, including:
    means for time averaging said plurality of pressure signals and thereby producing a plurality of average pressure signals;
    means for detecting a maximum average pressure signal in a preselected number of said plurality of average pressure signals; and
    means for detecting an end of dig function in response to a quotient of said maximum average pressure signal divided by said average pressure signal exceeding a second predetermined constant.

7. An apparatus, as set forth in claim 1, wherein said means for identifying the function includes:
    means for comparing one of said pressure signals to another of said pressure signals and responsively producing a difference signal; and
    means for detecting a roading function in response to said difference signal being greater than a first predetermined constant and less than a second predetermined constant.

8. An apparatus, as set forth in claim 7, including means for detecting an end of roading function in response to said difference signal being less than said predetermined constant.

9. An apparatus, as set forth in claim 1, wherein said means for identifying the function includes:
 means for identifying a maximum pressure signal in a preselected number of said plurality of said average pressure signals;
 means for comparing one of said pressure signals to another of said pressure signals and responsively producing a difference signal; and
 means for detecting a dumping function in response to said maximum pressure signal exceeding a first pressure signal and said difference signal being less than a second predetermined constant.

10. A method for determining which of a plurality of functions in a loading cycle is being performed by a vehicle having at least one lift cylinder for elevating a payload carrier, comprising the steps of:
 sensing the hydraulic pressure of said lift cylinder and responsively producing a plurality of pressure signals;
 storing said plurality of pressure signals and at least one predetermined constant;
 retrieving said plurality of pressure signals and said predetermined constant; and
 identifying the function being performed in the loading cycle in response to said plurality of pressure signals and said predetermined constant.

11. A method, as set forth in claim 10, wherein said step of identifying the function includes the steps of:
 deriving a second order time dependent polynomial in response to said plurality of pressure signals;
 producing a first signal being indicative of the degree of fit of said plurality of pressure signals to said second order time dependent polynomial; and
 detecting a lifting function in response to said first signal exceeding a first predetermined constant.

12. A method, as set forth in claim 11, including the steps of:
 comparing one of said pressure signals to another of said pressure signals and responsively producing a difference signal; and
 detecting an end of lift function in response to said difference signal exceeding a second predetermined constant.

13. A method, as set forth in claim 10, wherein said step of identifying the function includes the steps of:
 comparing one of said pressure signals to another of said pressure signals and responsively producing a difference signal; and
 detecting a digging function in response to said difference signal exceeding a predetermined constant.

14. A method, as set forth in claim 13, including the steps of:
 time averaging said plurality of pressure signals and thereby producing a plurality of average pressure signals;
 detecting a maximum average pressure signal in a preselected number of said plurality of average pressure signals; and
 detecting an end of dig function in response to a quotient of said maximum average pressure signal divided by one of said average pressure signals exceeding a second predetermined constant.

15. A method, as set forth in claim 10, wherein said step of identifying the function includes the steps of:
 comparing one of said pressure signals to another of said pressure signals and responsively producing a difference signal; and
 detecting a roading function in response to said difference signal being greater than a first predetermined constant and less than a second predetermined constant.

16. A method, as set forth in claim 15, including the step of detecting an end of roading function in response to said difference signal being less than said predetermined constant.

17. A method, as set forth in claim 10, wherein said step of identifying the function includes the steps of:
 time averaging said plurality of pressure signals and thereby producing a plurality of average pressure signals;
 identifying a maximum average pressure signal in a preselected number of said plurality of said average pressure signals;
 comparing one of said pressure signals to another of said pressure signals and responsively producing a difference signal; and
 detecting a dumping function in response to said maximum average pressure signal exceeding a first predetermined constant and said difference signal being less than a second predetermined constant.

* * * * *